Patented Nov. 28, 1939

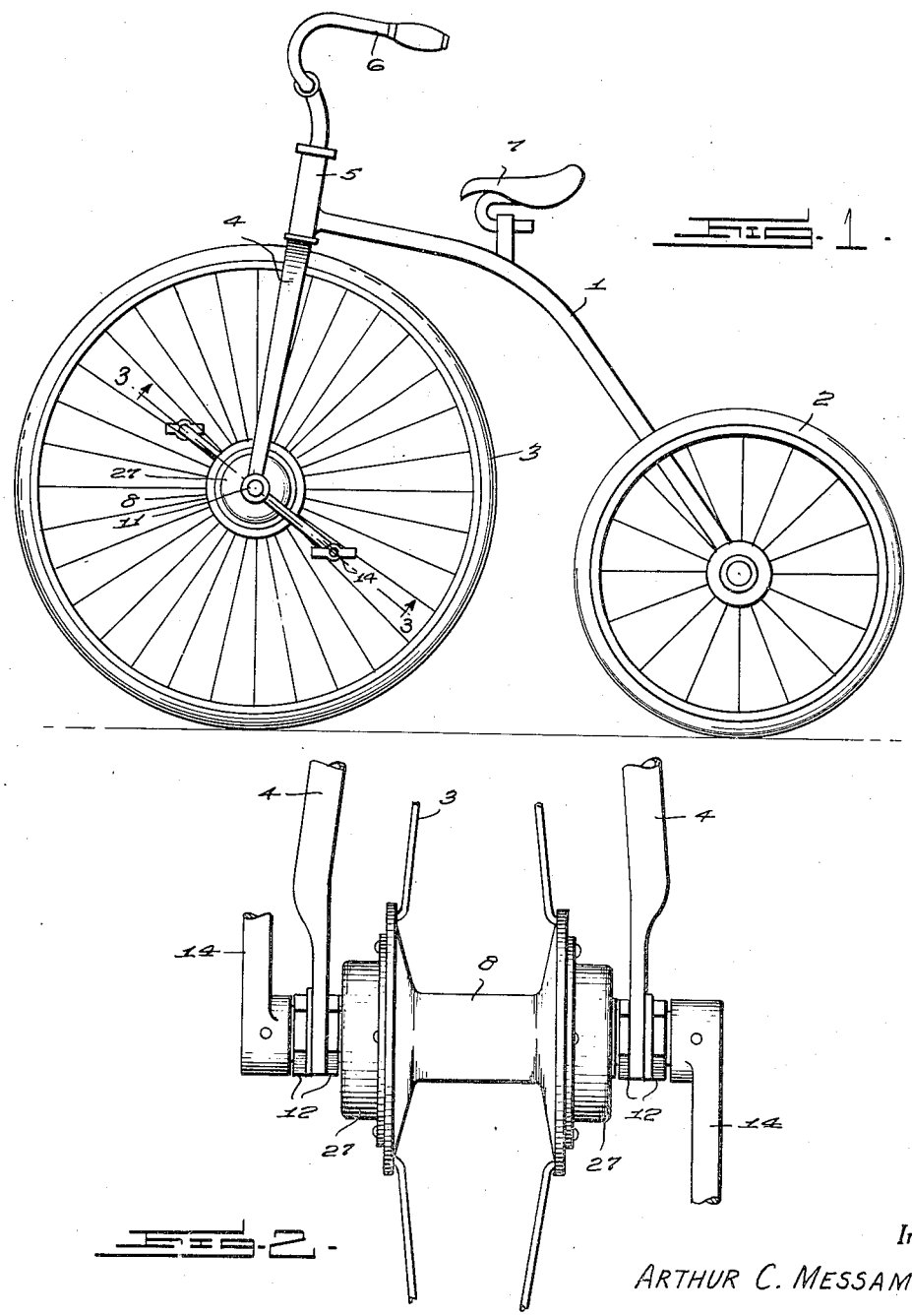

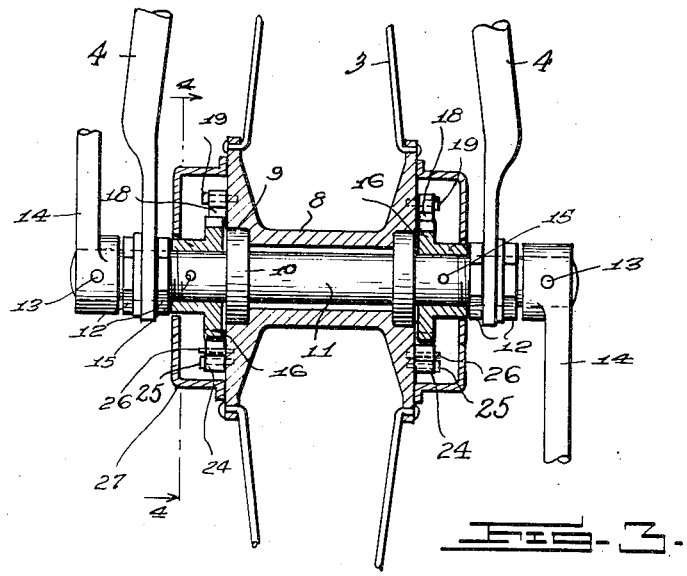
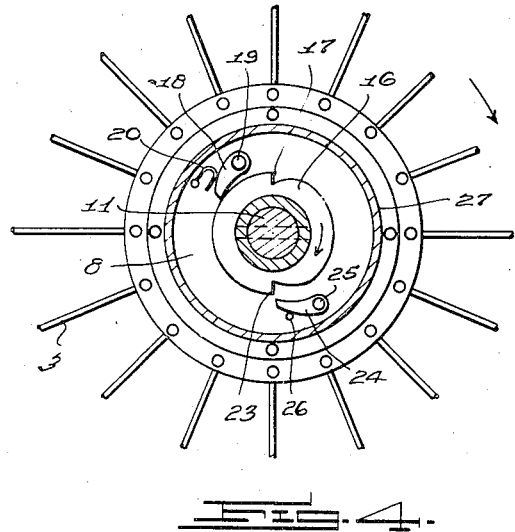

2,181,665

UNITED STATES PATENT OFFICE 2,181,665

PEDAL DRIVE FOR VELOCIPEDES

Arthur C. Messamore, Clinton, Tenn.

Application November 5, 1938, Serial No. 239,147

1 Claim. (Cl. 192—64)

My invention relates to improvements in pedal drives for velocipedes, or similar vehicles.

The invention is designed with the particular purpose in view of equipping a velocipede inexpensively, with a simply constructed efficient, free wheeling, or coasting, drive adapted to be controlled by back pedalling.

Another object is to provide for such vehicle, a forward and reverse drive of the pawl and ratchet type in which forward and reverse driving pawls are embodied and each idling under operation of the other.

To the accomplishment of the above, and subordinate objects presently appearing, a preferred embodiment of my invention has been illustrated in the accompanying drawings, set forth in detail in the succeeding description, and defined in the claim appended hereto.

In said drawings:

Figure 1 is a view in side elevation of a velocipede equipped with my improved drive.

Figure 2 is a fragmentary view in front elevation.

Figure 3 is a fragmentary view in vertical section taken on the line 3—3 of Figure 1 looking in the direction indicated by the arrows.

Figure 4 is a view in section taken on the line 4—4 of Figure 3 looking in the direction indicated by the arrows.

Referring to the drawings by numerals, my improved drive has been shown therein as forming part of the equipment of the usual velocipede including the frame 1, rear wheels, one of which is shown at 2, and a front driving wheel 3 operating in the forks 4 rotatable in the usual fork bearing sleeve 5 by means of the handle bar 6 from the seat 7.

According to my invention, the hub 8 of the driving wheel 3 is recessed at its opposite ends, as at 9, to fit over and rotate upon a pair of collars 10 fast upon the spindle 11, said collars forming end thrust and anti-friction bearings for said hub. The opposite ends of the spindle 11 are mounted in suitable end thrust bearing members 12 extending through the forks 4 and said ends of the spindle 11 have fixed thereon, as by pins 13, the usual pedal shanks 14.

The spindle 11 has fixed thereon, as by pins 15, a pair of ratchet discs 16 located adjacent opposite ends of the hub 8 and between said ends and the bearings 12. The discs 16 are notched to provide a pair of diametrically opposite teeth 17 and 23 thereon, respectively. The teeth 17 of each disc are horizontally aligned, likewise the teeth 23. A pair of pawls 18 are pivotally mounted on opposite ends of the hub 8, respectively, as by pins 19, and are tensioned by suitable springs, as at 20, to be engaged by the teeth 17 of the discs 16, respectively, under rotation of the spindle 11 by the pedal shanks 14 in a forward driving direction, i. e., clockwise as viewed in Figure 4.

Referring to the operation of the parts as so far described, under forward driving operation of the spindle 11, in the direction above indicated, the teeth 17 of the discs 16 pick up the pawls 18 and thereby impart forward rotation to the driving wheel 3. By holding the spindle 11 stationary, through the medium of the pedal shanks 14, free wheeling, or coasting, of the driving wheel 3 may be caused to occur, under the momentum of the vehicle, the pawls 18 wiping around the discs 16 in a manner which will be clear.

To control and check the described free wheeling operation a back pedal, or reverse drive, is provided as follows. Cooperating with the teeth 23 of the discs 16 is a pair of gravity actuated pawls 24 pivotally mounted, as at 25, on opposite ends of the hub 8, respectively, for gravitational engagement with the teeth 23, the arrangement being such that under rotation of the spindle 11 by back pedalling, i. e., counter-clockwise as viewed in Figure 4, said teeth 23 will pick up the pawls 24 when the latter together with said teeth are uppermost and have gravitated into the path of movement of said teeth, and thereby tend to drive the wheel 3 backwardly. Suitable stop pins 26 extending from the opposite ends of the hub 8 limit movement of the pawls 24 in a disengaging direction.

A pair of dust caps 27 suitably secured to opposite ends of the hub 8 house the discs 16, and the pawls 18 and 24. As will be understood, under rotation of the spindle 11 in a forward driving direction, the pawls 24 will wipe over the teeth 23 of the discs 16 and remain idle.

My invention will, it is believed, be readily understood from the foregoing without further explanation.

Manifestly, the invention, as described, is susceptible of modification without departing from the inventive concept and right is herein reserved to such modifications as fall within the scope of the subjoined claim.

What I claim is:

A pedal drive for use on the front wheel of a velocipede having front wheel forks comprising a driving spindle adapted to be rotatably mounted in said forks for operation by said pedals in forward and reverse driving directions, respectively, a hub for said wheel rotatably mounted on said spindle and adapted to be interposed between said forks, and a forward and reverse clutch between said spindle and hub including a pair of disks fixedly connected to said spindle adjacent the opposite ends thereof, respectively, and each notched to provide a pair of teeth thereon, the teeth on each disk being diametrically opposite, and the teeth on each side of said disks being horizontally aligned, a pair of spring-pressed forward driving pawls pivotally mounted on said hub for engagement with the teeth on one side of the disks, and a pair of reverse driving pawls pivotally mounted on said hub for gravitational action to engage the teeth on the other side of said disks.

ARTHUR C. MESSAMORE.